Figure 1:
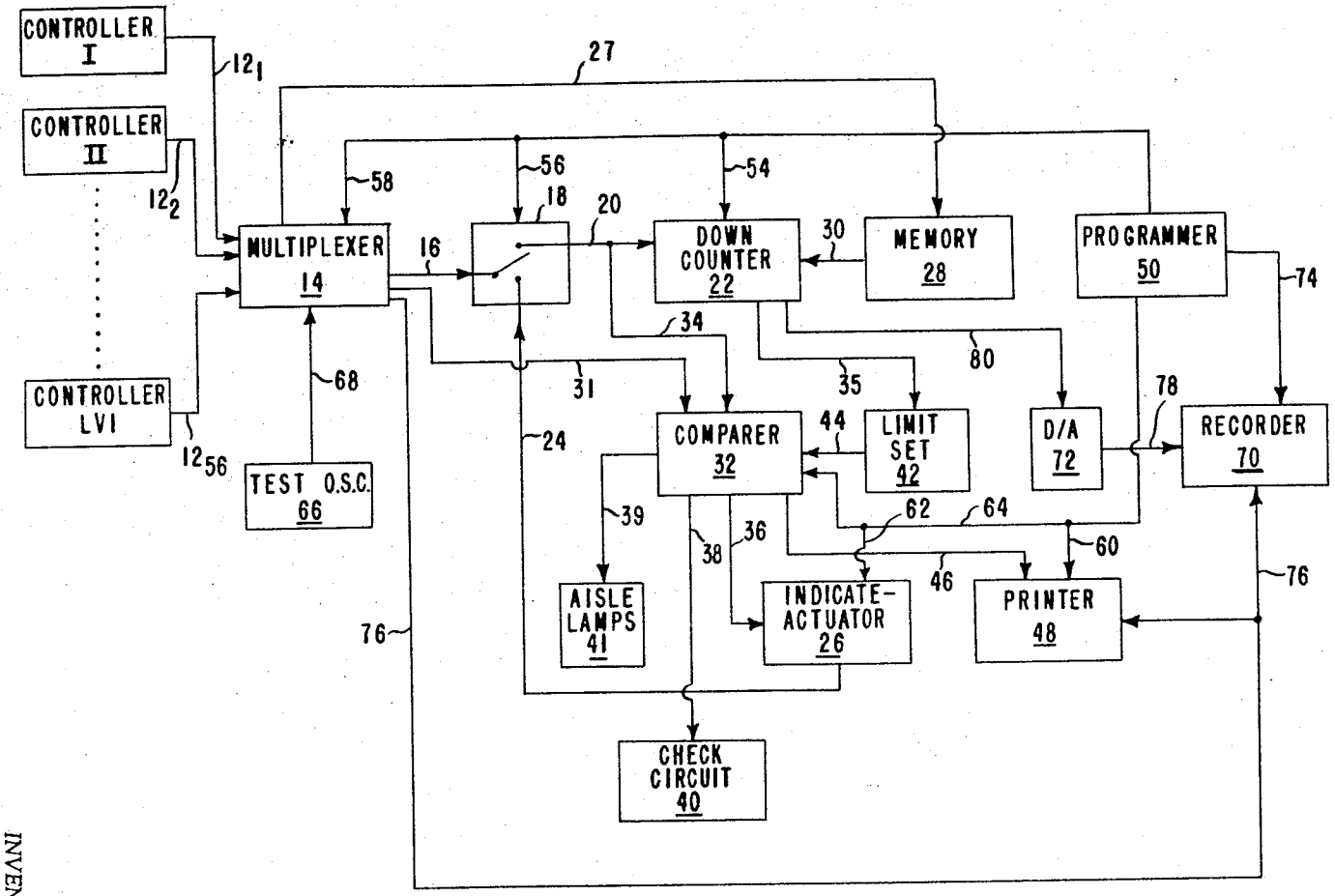
Figure 2:
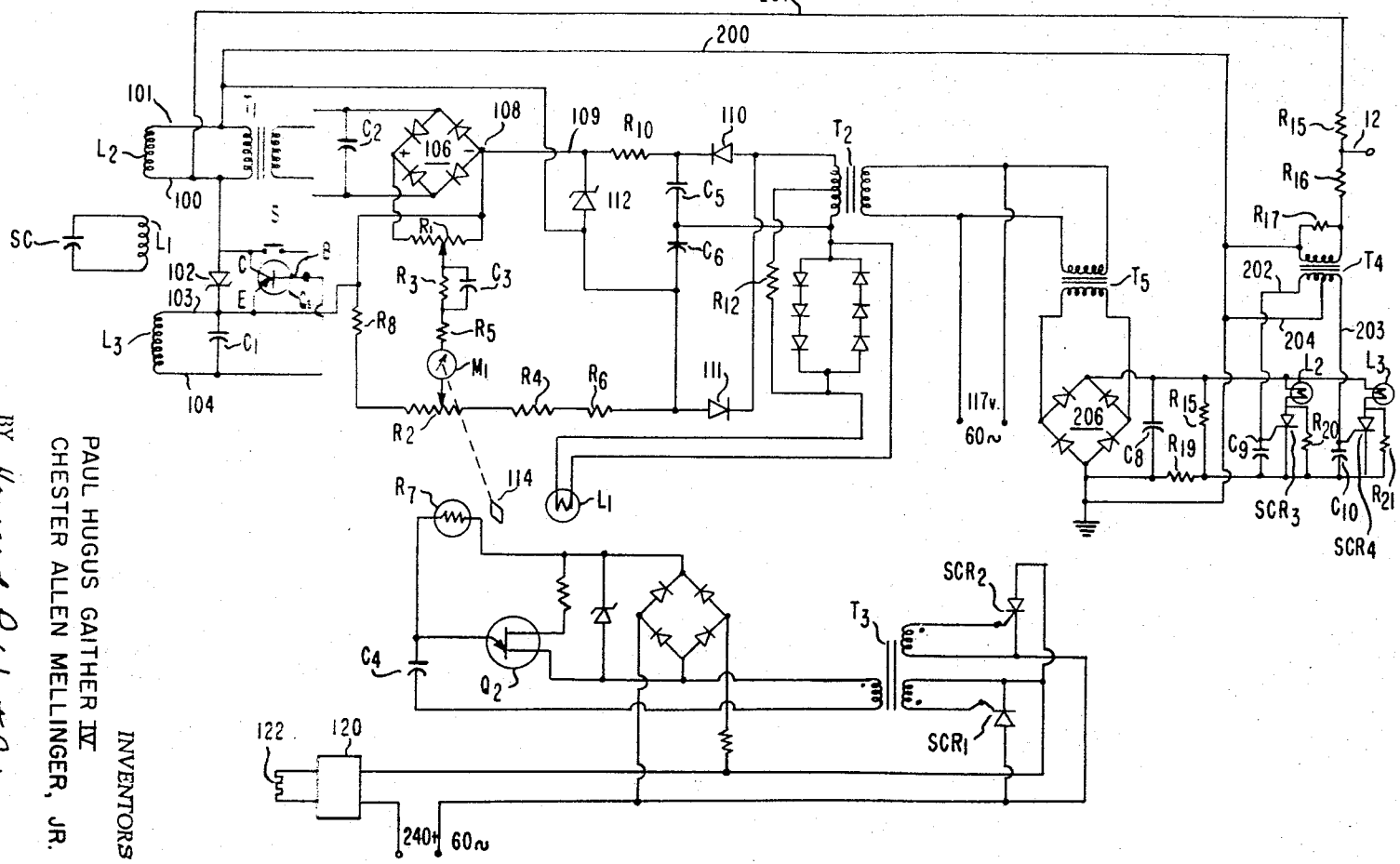
Figure 3A:
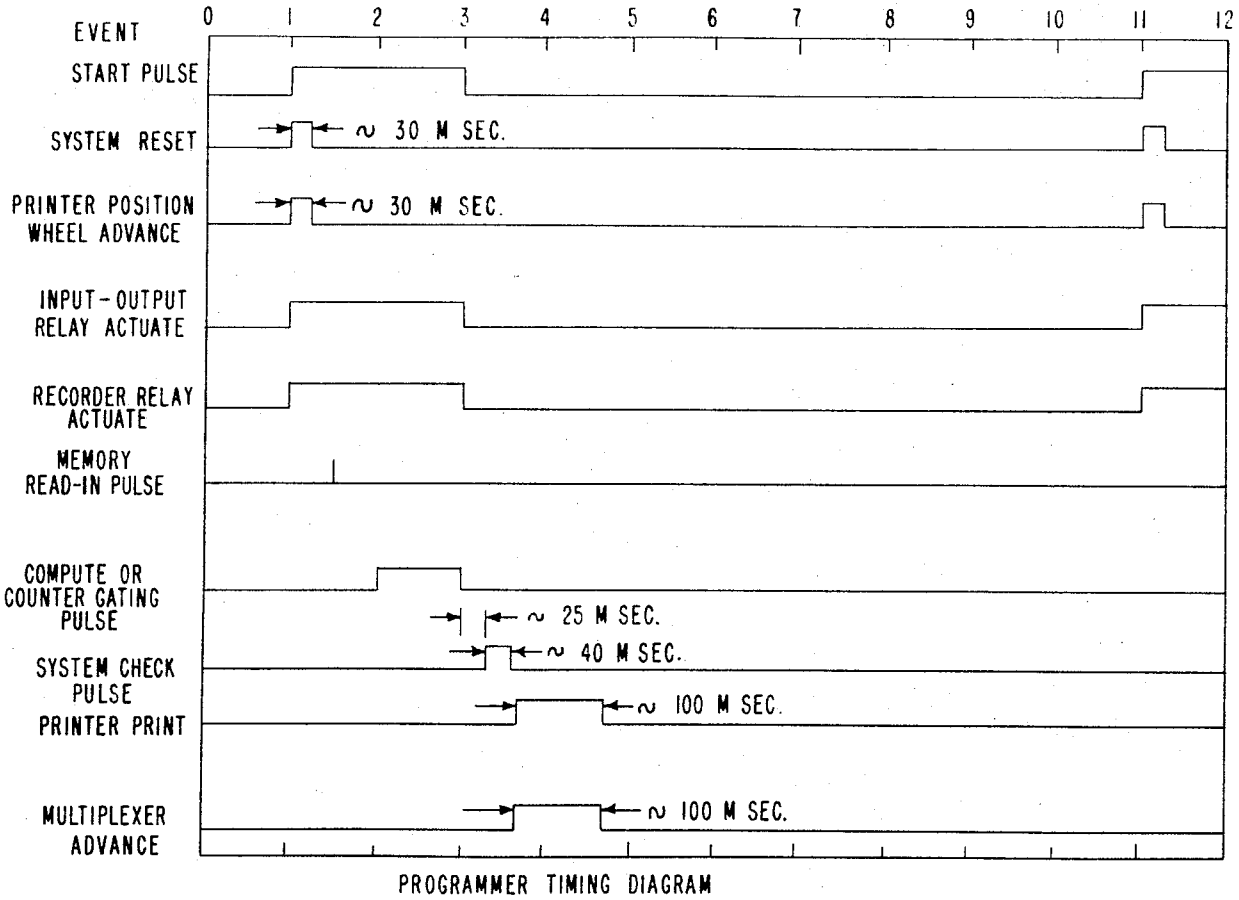
Figure 5:
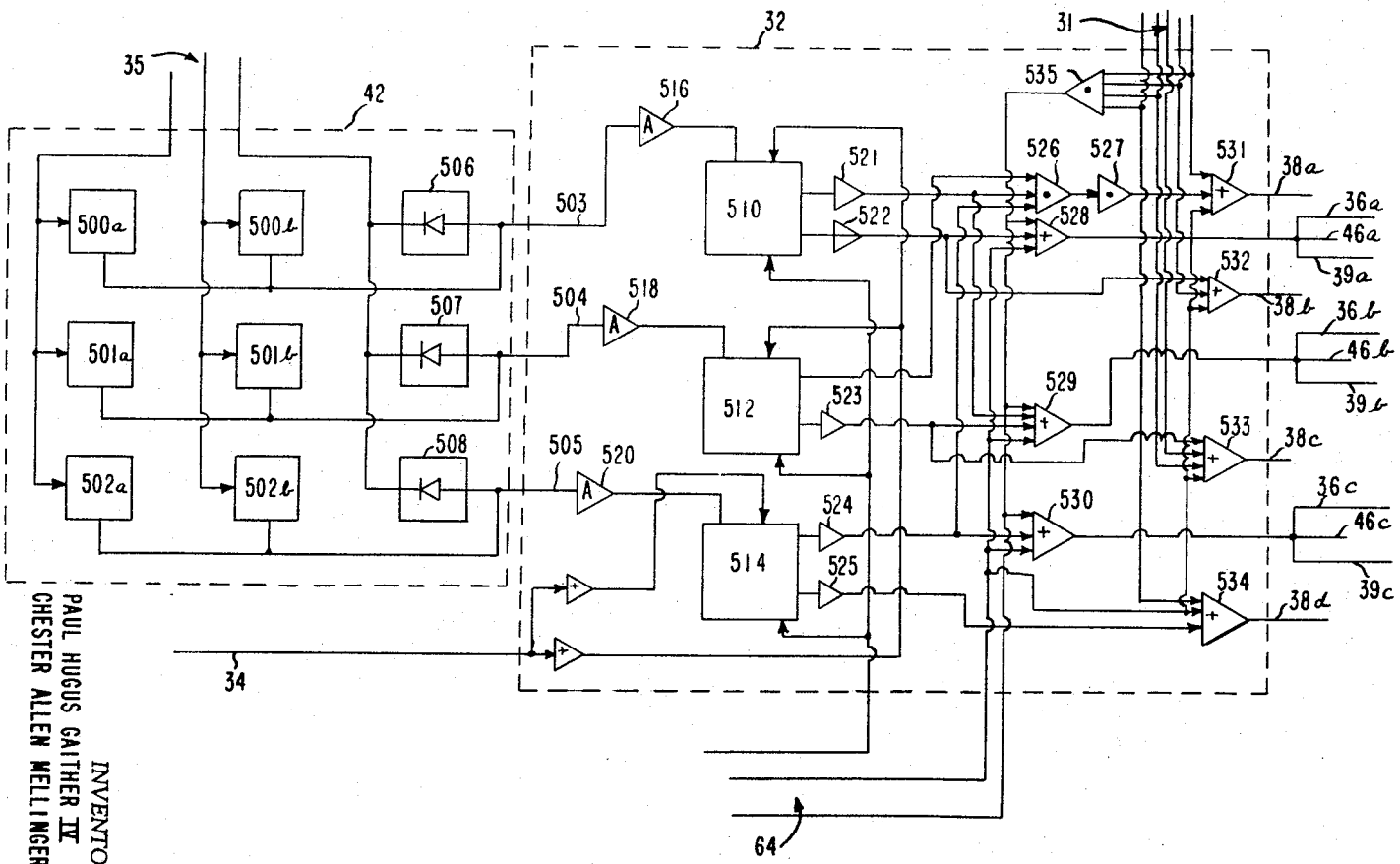
Figure 6:
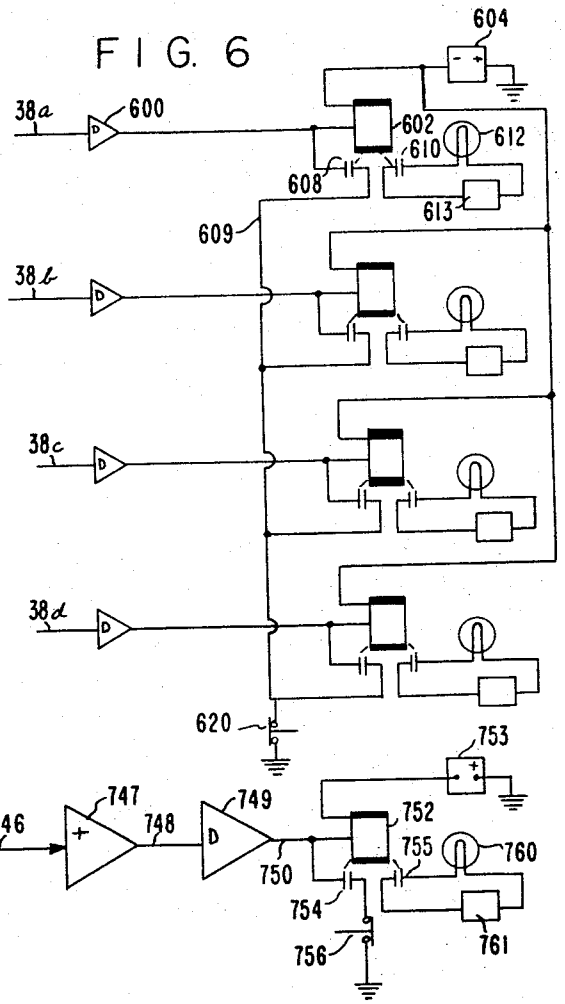
Figure 7:
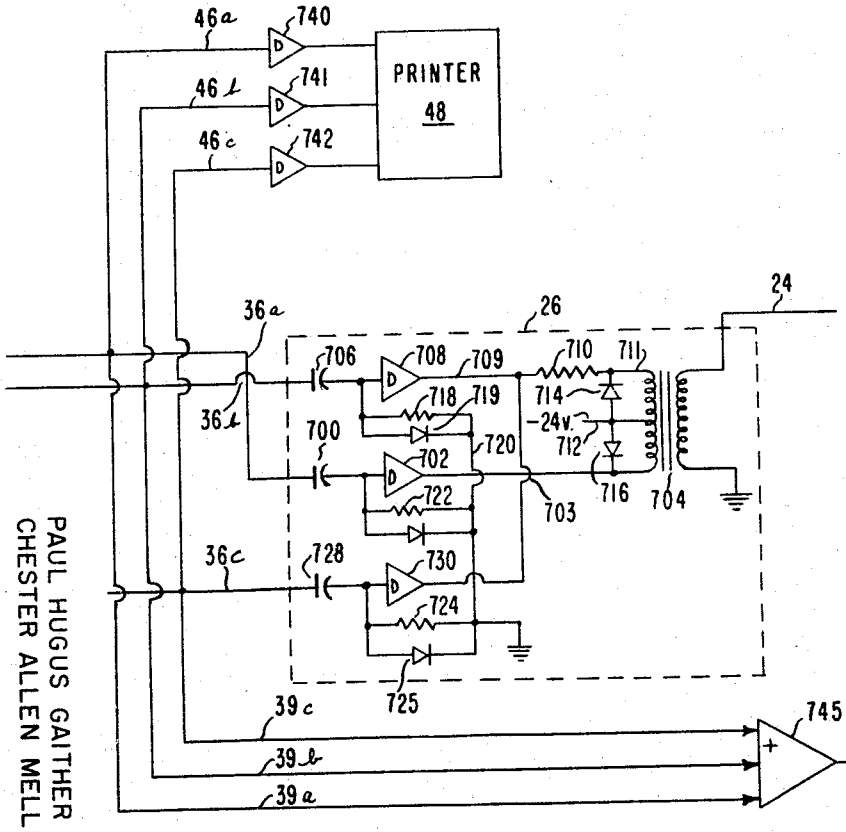
Figure 8:
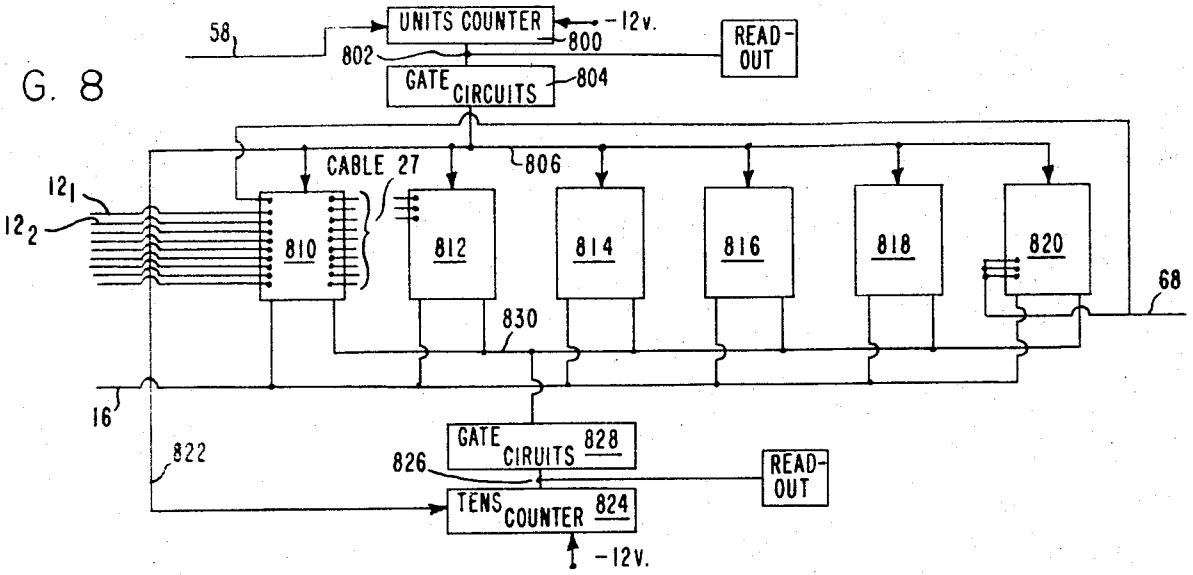
Figure 9:
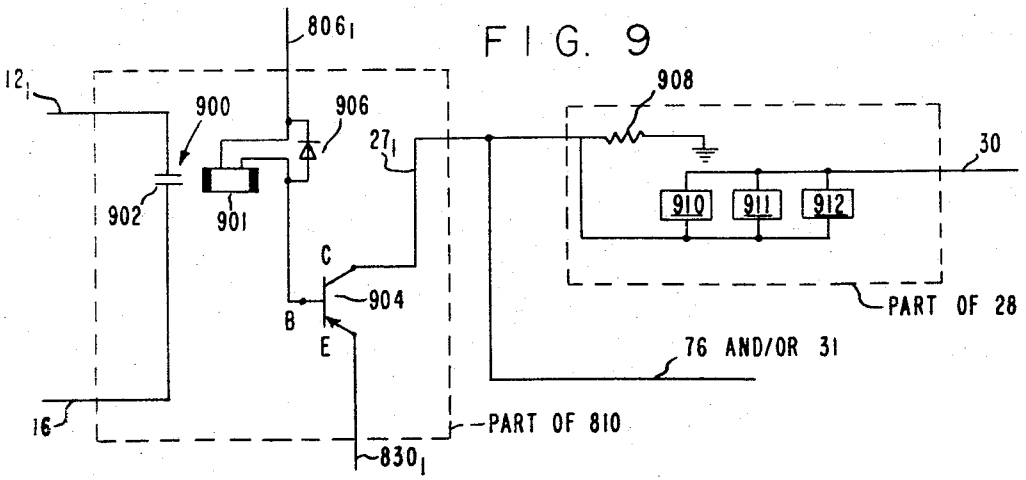

T861017

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 367

573,227

TEMPERATURE DEVIATION INDICATOR FOR PLURAL CAPACITIVE TEMPERATURE SENSORS

Paul Hugus Gaither IV, Claymont, and Chester Allen Mellinger, Jr., Wilmington, Del., assignors to E. I. du Pont de Nemours and Company, Wilmington, Del., a corporation of Delaware

Filed Aug. 18, 1966. Published Apr. 8, 1969

Class 340—227

7 Sheets Drawing. 21 Pages Specification

This invention relates to a multi-position machine having temperatures controlled with capacitor temperature controllers of the type disclosed in U.S. Patent No. 3,112,-070. The device of the invention comprises a solid state actuated, reed relay time sharing multiplexer for connecting each controller sequentially, individually, first to the input and then to the output terminals of a monitor. The monitor comprises an assembly of logic circuit modules including a programmer to ensure the proper sequence of operations; a memory to store characteristic standard frequency value for each controller; a down-counter to compute the magnitude and sign of the difference between the actual frequency output of the controller and its frequency at set temperature; a limit set module to furnish tolerable

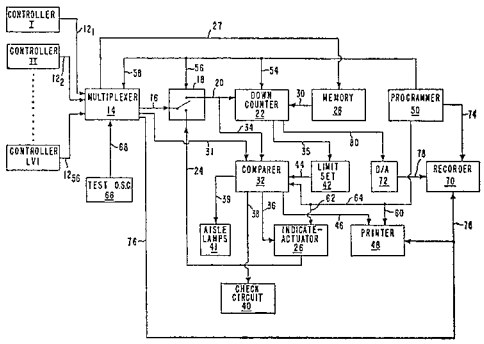

limits to the above frequency difference; a compare module to furnish a signal when the frequency difference exceeds any of the set limits; and an indicate actuator module to furnish a positive or negative pulse back to the controller when the high or low frequency difference limit has been exceeded. In each controller there is provided an indicator lamp lighting circuit responsive to signals from the indicate actuator module such that one lamp is energized upon receipt of a positive pulse or another lamp for a negative pulse.

SN - 573227 T861017

April 8, 1969 P. H. GAITHER IV, ETAL DEF. PUB.

TEMPERATURE DEVIATION INDICATOR FOR PLURAL CAPACITIVE TEMPERATURE SENSORS

Filed Aug. 18, 1966 Sheet 1 of 7

INVENTORS

PAUL HUGUS GAITHER IV

CHESTER ALLEN MELLINGER, JR.

BY Howard P. West Jr

ATTORNEY

SN - 573227 T861017

April 8, 1969 P. H. GAITHER IV, ETAL DEF. PUB.

TEMPERATURE DEVIATION INDICATOR FOR PLURAL CAPACITIVE TEMPERATURE SENSORS

Filed Aug. 18, 1966 Sheet 2 of 7

INVENTORS

PAUL HUGUS GAITHER IV

CHESTER ALLEN MELLINGER, JR.

BY Howard P. West Jr

ATTORNEY

SN - 573227 T861017
April 8, 1969 P. H. GAITHER IV, ETAL DEF. PUB.
TEMPERATURE DEVIATION INDICATOR FOR PLURAL CAPACITIVE TEMPERATURE SENSORS
Filed Aug. 18, 1966 Sheet 3 of 7
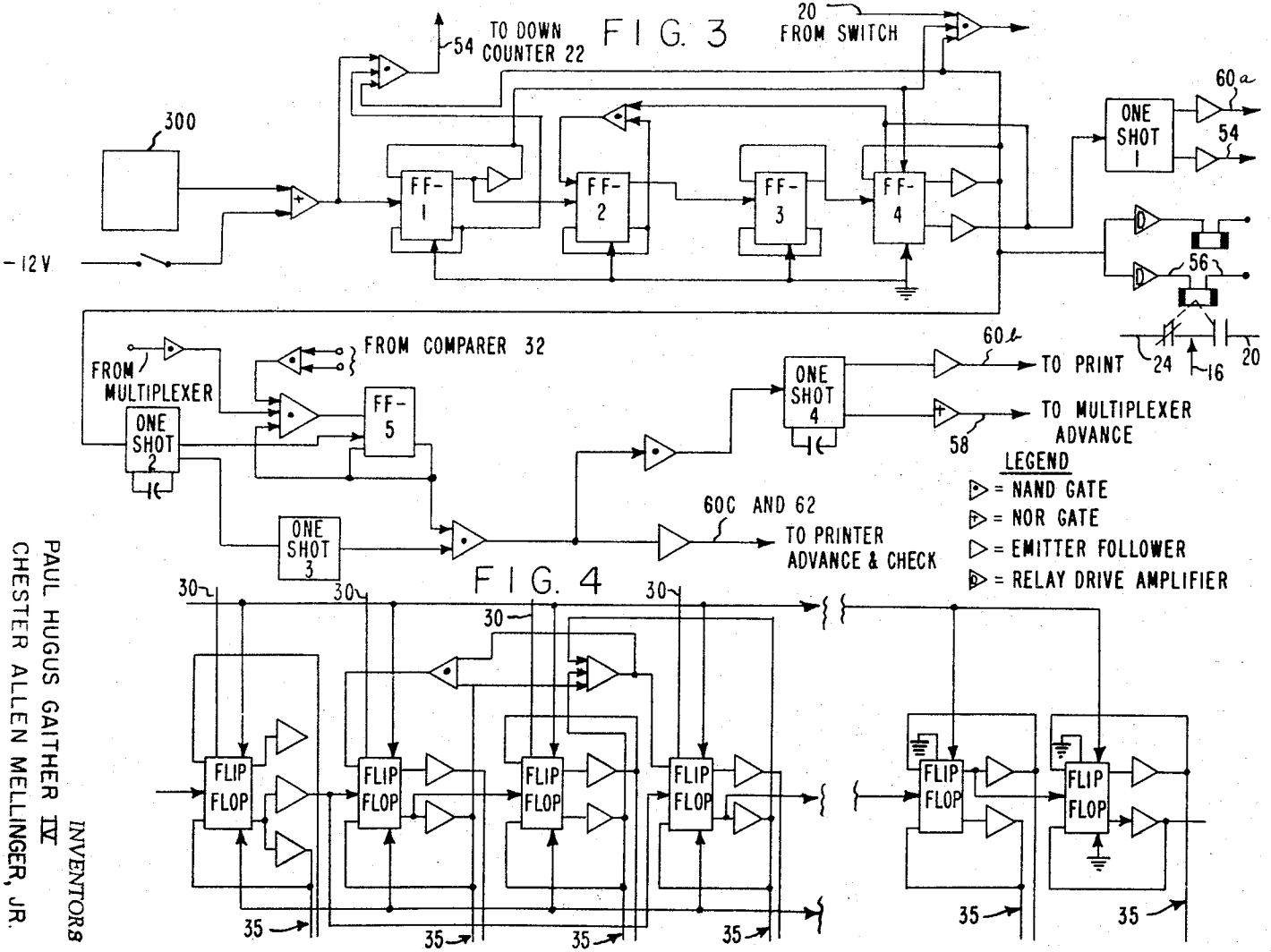
INVENTORS
PAUL HUGUS GAITHER IV
CHESTER ALLEN MELLINGER, JR.
BY Howard P. West Jr
ATTORNEY

SN - 573227 T861017

April 8, 1969 P. H. GAITHER IV, ETAL DEF. PUB.

TEMPERATURE DEVIATION INDICATOR FOR PLURAL CAPACITIVE TEMPERATURE SENSORS

Filed Aug. 18, 1966 Sheet 4 of 7

PROGRAMMER TIMING DIAGRAM

INVENTORS

PAUL HUGUS GAITHER IV
CHESTER ALLEN MELLINGER, JR.

BY Howard P. West Jr

ATTORNEY

T861017

SN - 573227

April 8, 1969

P. H. GAITHER IV, ETAL DEF. PUB.

TEMPERATURE DEVIATION INDICATOR FOR PLURAL CAPACITIVE TEMPERATURE SENSORS

Filed Aug. 18, 1966

Sheet 5 of 7

INVENTORS
PAUL HUGUS GAITHER IV
CHESTER ALLEN MELLINGER, JR.

BY Howard P. West Jr

ATTORNEY

SN - 573227 T861017

April 8, 1969 P. H. GAITHER IV, ETAL DEF. PUB.

TEMPERATURE DEVIATION INDICATOR FOR PLURAL CAPACITIVE TEMPERATURE SENSORS

Filed Aug. 18, 1966 Sheet 6 of 7

INVENTORS

PAUL HUGUS GAITHER IV
CHESTER ALLEN MELLINGER, JR.

BY Howard P. West Jr

ATTORNEY

SN - 573227 T861017

April 8, 1969 P. H. GAITHER IV, ETAL DEF. PUB.

TEMPERATURE DEVIATION INDICATOR FOR PLURAL CAPACITIVE TEMPERATURE SENSORS

Filed Aug. 18, 1966 Sheet 7 of 7

INVENTORS
PAUL HUGUS GAITHER IV
CHESTER ALLEN MELLINGER, JR.

BY Howard P. West Jr

ATTORNEY